US012655333B2

(12) United States Patent (10) Patent No.: US 12,655,333 B2
Tanaka et al. (45) Date of Patent: Jun. 16, 2026

(54) BONDING METHOD

(71) Applicant: NITTO DENKO CORPORATION, Ibaraki (JP)

(72) Inventors: Akiko Tanaka, Ibaraki (JP); Yuto Suzuki, Ibaraki (JP); Chie Hamada, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 489 days.

(21) Appl. No.: 18/037,764

(22) PCT Filed: Nov. 18, 2021

(86) PCT No.: PCT/JP2021/042433
§ 371 (c)(1),
(2) Date: May 18, 2023

(87) PCT Pub. No.: WO2022/107849
PCT Pub. Date: May 27, 2022

(65) Prior Publication Data
US 2024/0002707 A1 Jan. 4, 2024

(30) Foreign Application Priority Data
Nov. 20, 2020 (JP) ................................. 2020-193664

(51) Int. Cl.
*C09J 163/04* (2006.01)
*C08G 59/68* (2006.01)

(52) U.S. Cl.
CPC .......... *C09J 163/04* (2013.01); *C08G 59/686* (2013.01); *C09J 2463/00* (2013.01)

(58) Field of Classification Search
None
See application file for complete search history.

(56) References Cited

U.S. PATENT DOCUMENTS

2010/0068497 A1   3/2010   Harrington
2014/0106147 A1*  4/2014   Lee ...................... H05K 1/0271
                                                                524/602
2018/0327635 A1*  11/2018  Yoshida ..................... C09J 7/30

2019/0010361 A1   1/2019   Hoshi et al.
2019/0016925 A1   1/2019   Tanaka et al.
2021/0403759 A1   12/2021  Yoshida et al.

FOREIGN PATENT DOCUMENTS

| EP | 1072634 A1 | 1/2001 |
|---|---|---|
| EP | 2759578 A1 | 7/2014 |
| EP | 3643500 A1 | 4/2020 |
| JP | 2000-336333 A | 12/2000 |
| JP | 2009-167251 A | 7/2009 |
| JP | 2017-82091 A | 5/2017 |
| JP | 2017-88723 A | 5/2017 |
| JP | 2017-165086 A | 9/2017 |
| JP | 2018-172642 A | 11/2018 |
| JP | 2018-177960 A | 11/2018 |
| JP | 2018-177963 A | 11/2018 |
| JP | 2019-172744 A | 10/2019 |
| WO | 2018/173898 A1 | 9/2018 |

OTHER PUBLICATIONS

International Search Report issued on Jan. 18, 2022, for corresponding International Patent Application No. PCT/JP2021/042433, along with an English translation (7 pages).
Written Opinion issued on Jan. 18, 2022, for corresponding International Patent Application No. PCT/JP2021/042433 (6 pages).
Office Action issued on Aug. 26, 2025, for corresponding Taiwanese Patent Application No. 110143197, along with an English machine translation (12 pages).
Extended European Search Report issued Sep. 12, 2024, corresponding to European Application No. 21894721.6, 8 pages.
Office Action issued on Sep. 24, 2025, for corresponding Japanese Patent Application No. 2022-563824, along with an English machine translation (15 pages).
Office Action dated Apr. 28, 2026, for the corresponding Japanese Patent Application No. 2022-563824, along with an English machine translation (20 pages).

* cited by examiner

*Primary Examiner* — Robert S Jones, Jr.
*Assistant Examiner* — Lily K Sloan
(74) *Attorney, Agent, or Firm* — Hauptman Ham, LLP

(57) ABSTRACT

A bonding method for providing an adhesive layer and a curing agent layer between a first adherend and a second adherend to bond the first adherend and the second adherend in which: the adhesive layer contains an epoxy resin as a main component and is cured by an effect of the curing agent layer; a curing agent contained in the curing agent layer is a polymerization catalyst type curing agent; and a thickness A (m) of the adhesive layer before curing and the application amount B ($kg/m^2$) of the curing agent contained in the curing agent layer satisfy $5<B/A<900$.

8 Claims, 2 Drawing Sheets

1

6

BONDING METHOD

CROSS REFERENCE TO RELATED APPLICATION

This application is a National Stage of International Application No. PCT/JP2021/042433, filed on Nov. 18, 2021, which designates the United States and was published in Japan, and which is based upon and claims priority to Japanese Patent Application No. 2020-193664, filed on Nov. 20, 2020 in the Japan Patent Office. All of the aforementioned applications are hereby incorporated by reference in their entireties.

TECHNICAL FIELD

The present invention relates to a bonding method and relates especially to a bonding method for providing an adhesive layer and a curing agent layer between a first adherend and a second adherend to bond the first adherend and the second adherend.

BACKGROUND ART

As a conventional bonding method, there is known a method using a two-component adhesive in which two liquid agents of a main agent (liquid A) and a curing agent (liquid B) are mixed and used (for example, see PTL 1 below).

In the bonding method described in PTL 1, the main agent and the curing agent are each weighed just before use and mixed to prepare a mixed liquid. The mixed liquid is applied to a first resin plate to form a coating film, and the first resin plate and another resin plate are stuck together through the coating film.

Then, in the coating film, the main agent is cured through the reaction of the main agent and the curing agent, and thus the two resin plates are bonded strongly.

PTL 2 below discloses a bonding method characterized by having a step (1) of placing an adhesive layer on a first adherend, a step (2) of placing on a second adherend a curing agent layer which can cure the adhesive layer by contacting and reacting with the adhesive layer, and a step (3) of bringing the adhesive layer and the curing agent layer into contact with each other in such a manner that the layers are sandwiched between the first adherend and the second adherend.

CITATION LIST

Patent Literature

PTL 1: JP2000-336333A
PTL 2: JP2017-88723A

SUMMARY OF INVENTION

Technical Problem

In the bonding method using a two-component adhesive described in PTL 1, however, it is necessary to weigh each of the main agent and the curing agent and mix the agents just before use. Thus, the bonding method has a defect of complicated steps.

Moreover, the bonding method described in PTL 2 has a problem because curing is uneven and because the reliability of physical properties of the obtained bonded structure is impaired. Examples of the application of the bonded structure obtained by the bonding method described in PTL 2 include a fixing material of a sensor for detecting stress and the like, and fluctuation in the physical properties of the bonded structure adversely influences the sensor function.

Accordingly, an object of the present invention is to provide a bonding method which can simply and strongly bond a first adherend and a second adherend and which can also suppress unevenness of curing of the adhesive layer after curing and inhibit undesired fluctuation in the physical properties.

Solution to Problem

The present invention is as follows.
1. A bonding method for providing an adhesive layer and a curing agent layer between a first adherend and a second adherend to bond the first adherend and the second adherend, wherein
   the adhesive layer contains an epoxy resin as a main component and is cured by an effect of the curing agent layer,
   a curing agent contained in the curing agent layer is a polymerization catalyst type curing agent, and
   a thickness A (m) of the adhesive layer before curing and the application amount B (kg/m$^2$) of the curing agent contained in the curing agent layer satisfy the expression (1) below:

$$5 < B/A < 900 \tag{1}$$

2. The bonding method according to item 1, wherein the polymerization catalyst type curing agent is an imidazole compound.
3. The bonding method according to item 1 or 2, wherein the elastic modulus (Pa) of the adhesive layer after curing is 10 times or more the elastic modulus (Pa) of the adhesive layer before curing.
4. The bonding method according to any one of items 1 to 3, wherein the elastic modulus (Pa) of the adhesive layer after curing is 5×10$^7$ (Pa) or more under the condition after lapse of 48 hours at room temperature (25° C.).
5. The bonding method according to any one of items 1 to 4, wherein a proportion of a solid resin in the adhesive layer before curing is 15 mass % or more and 80 mass % or less.
6. The bonding method according to any one of items 1 to 5, wherein the thickness of the adhesive layer before curing is 3 μm or more and 100 μm or less.
7. The bonding method according to any one of 1 to 6, wherein the adhesive layer includes a porous sheet impregnated with an adhesive composition containing an epoxy resin as a main component.

Advantageous Effects of Invention

According to an embodiment of the invention, there can be provided a bonding method which can simply and strongly bond a first adherend and a second adherend and which can also suppress unevenness of curing of the adhesive layer after curing and inhibit undesired fluctuation of the physical properties.

BRIEF DESCRIPTION OF DRAWINGS

FIG. 1A illustrates a step (1) of placing an adhesive layer on a first adherend and a step (2) of placing a curing agent layer on a second adherend.

FIG. 1B illustrates a step (3) of placing the adhesive layer and the curing agent layer in such a manner that the layers are sandwiched between the first adherend and the second adherend.

DESCRIPTION OF EMBODIMENTS

An embodiment in the present invention is explained below.

A bonding method in the present embodiment is a bonding method for providing an adhesive layer and a curing agent layer between a first adherend and a second adherend to bond the first adherend and the second adherend, wherein the adhesive layer contains an epoxy resin as a main component and is cured by an effect of the curing agent layer, a curing agent contained in the curing agent layer is a polymerization catalyst type curing agent, and a thickness A (m) of the adhesive layer before curing and the application amount B (kg/m$^2$) of the curing agent contained in the curing agent layer satisfy the expression (1) below:

$$5 < B/A < 900 \tag{1}$$

Examples of the means for providing the adhesive layer and the curing agent layer include (i) means for placing an adhesive layer on a first adherend, placing a curing agent layer which can cure the adhesive layer by reacting with the adhesive layer on a second adherend and placing the adhesive layer and the curing agent layer in such a manner that the layers are sandwiched between the first adherend and the second adherend, and (ii) means for placing an adhesive layer on a first adherend, providing on the adhesive layer a curing agent layer which can cure the adhesive layer by reacting with the adhesive layer and then placing a second adherend thereon.

First, an embodiment of the bonding method of the embodiment using the means of (i) is explained.

Figure 1A:
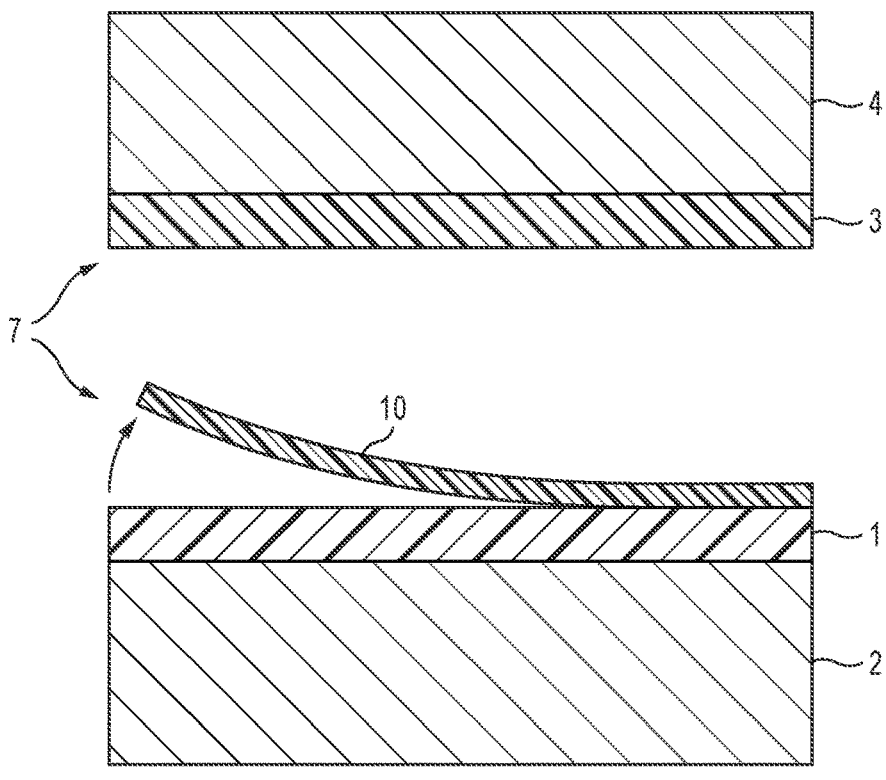
FIG. 1A and FIG. 1B are views of steps for explaining an embodiment of the bonding method of the present invention.
Figure 1B:
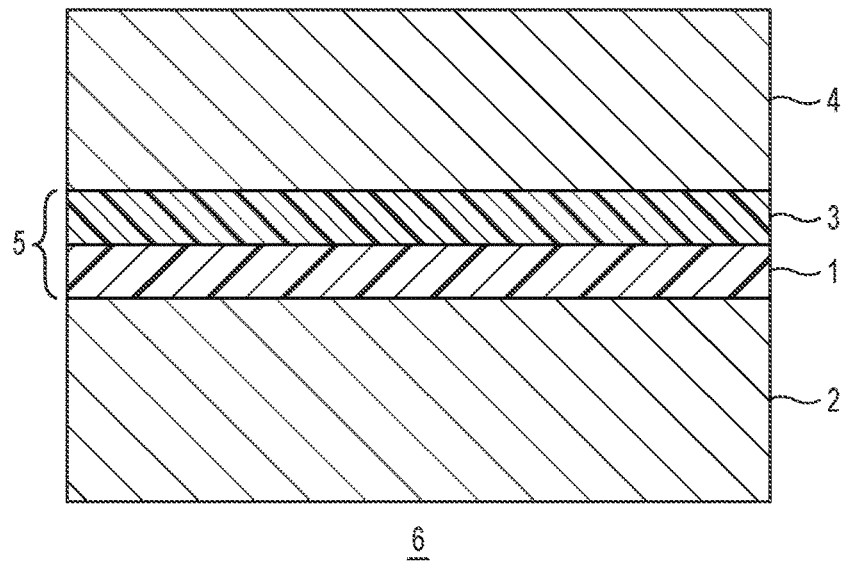

The bonding method of the embodiment using the means of (i) has a step (1) of placing an adhesive layer 1 on a first adherend 2 (see FIG. 1A), a step (2) of placing on a second adherend 4 a curing agent layer 3 which can cure the adhesive layer 1 by reacting with the adhesive layer 1 (see FIG. 1A) and a step (3) of placing the adhesive layer 1 and the curing agent layer 3 in such a manner that the layers are sandwiched between the first adherend 2 and the second adherend 4 (see FIG. 1B).

The steps are explained below.

Step (1) of (i)

In the step (1), the adhesive layer 1 is placed on the first adherend 2 as illustrated in FIG. 1A.

The adhesive layer 1 is a layer (sheet) which is cured by reacting with the curing agent layer 3, extends along the face direction (the direction perpendicular to the thickness direction) and has an approximately flat plate shape having a flat front surface and a flat back surface.

The adhesive layer 1 is sticky in an uncured state and thus can be pasted to an adherend as a sheet, and the adhesive layer 1 can also exhibit adhesiveness by curing.

To place the adhesive layer 1 on the first adherend 2, for example, the adhesive layer 1 is first formed on a surface of a release liner 10.

To form the adhesive layer 1 on the surface of the release liner 10, an adhesive composition is first prepared.

The adhesive composition is not particularly restricted as long as the adhesive composition contains an epoxy resin as a main component and is the main agent of a two-component adhesive which can form a layer.

Examples of a component which can be contained in addition to the epoxy resin include silicone compounds, polyol compounds such as polypropylene glycol, urethane resins, epoxy resins and the like.

The adhesive composition contains an epoxy resin as a main component and thus can simply and strongly bond the first adherend 2 and the second adherend 4. The "main component" here means the component which is contained in the composition or the layer in the highest amount on the mass basis.

Examples of the epoxy resin include: bisphenol epoxy resins such as bisphenol A epoxy resin, bisphenol F epoxy resin, bisphenol S epoxy resin and hydrogenated bisphenol A epoxy resin; naphthalene epoxy resins; biphenyl epoxy resins; dicycloepoxy resins; alicyclic epoxy resins; triglycidyl isocyanurate epoxy resins; hydantoin epoxy resins; glycidyl ether epoxy resins; glycidyl amino epoxy resins; and the like.

As the epoxy resin, a multifunctional epoxy resin having three or more functional groups can also be used. Examples of the multifunctional epoxy resin include glycidyl ether epoxy resins and glycidyl amino epoxy resins.

Examples of the glycidyl ether epoxy resins include phenol novolak, orthocresol novolak epoxy resin, DPP novolak epoxy resin, tris-hydroxy phenyl methane epoxy resin, tetraphenylol ethane epoxy resin, and the like.

Examples of the glycidyl amino epoxy resins include: diaminodiphenyl methane epoxy resins such as tetraglycidyldiaminodiphenylmethane; diaminodiphenyl sulfone epoxy resins such as tetraglycidyl diaminodiphenyl sulfone; tetraglycidyl methaxylene diamine; tetraglycidyl 1,3-bisaminomethyl cyclohexane; triglycidyl isocyanurate; hydantoin epoxy resins; and amino phenol epoxy resins.

Examples of the epoxy resin include preferably the bisphenol epoxy resin, more preferably the bisphenol A epoxy resin.

A kind of epoxy resin can be used alone, or two or more kinds thereof can also be used in combination.

In a case where a multifunctional epoxy resin is used, the amount thereof based on the entire epoxy resin is preferably 0.1 to 50 mass %, further preferably 0.5 to 40 mass %.

The epoxy resin may be in any of liquid, semi-solid and solid forms at normal temperature. A single use of a semi-solid epoxy resin and a combination use of a liquid epoxy resin and a solid epoxy resin are preferably specified. In this manner, a tacky, layered adhesive layer 1 can be formed from the adhesive composition with higher reliability.

The epoxy resin which is liquid at normal temperature is specifically liquid at 25° C. The viscosity of the liquid epoxy resin at 25° C. is, for example, 0.01 Pa·s or more, preferably 1 Pa·s or more.

Moreover, the viscosity of the liquid epoxy resin at 25° C. is, for example, 50 Pa·s or less, preferably 30 Pa·s or less.

The epoxy resin which is solid at normal temperature is specifically solid at 25° C. The softening point of the solid epoxy resin is, for example, 70° C. or higher, preferably 75° C. or higher.

In the embodiment, in the point of view such that the adhesive layer 1 can be easily formed into a sheet, the proportion of the solid resin (the resin which is solid at normal temperature (25° C.)) in the adhesive layer 1 before curing is preferably 15 mass % or more and 80 mass % or less, further preferably 20 mass % or more and 50 mass % or less.

The blending ratio of the liquid epoxy resin to the solid epoxy resin (mass ratio) (liquid epoxy resin/solid epoxy resin) is, for example, 1.0 or more, preferably 1.5 or more.

Moreover, the blending ratio of the liquid epoxy resin to the solid epoxy resin (mass ratio) (liquid epoxy resin/solid epoxy resin) is, for example, 6.0 or less, preferably 3.0 or less.

When the blending ratio of the liquid epoxy resin to the solid epoxy resin is the lower limit or more, the viscosity of the adhesive composition is reduced, and unevenness of the coating film is prevented from occurring; thus, a uniform adhesive layer 1 can be obtained. When the blending ratio of the liquid epoxy resin to the solid epoxy resin is the upper limit or less, a tacky, layered adhesive layer can be obtained.

The proportion of the epoxy resin blended is set to a proportion with which the epoxy resin is the main component of the adhesive composition. Specifically, the proportion of the epoxy resin in the adhesive composition is, for example, 80 mass % or more, preferably 90 mass % or more and is, for example, 100 mass % or less.

The adhesive composition preferably consists of the epoxy resin, which means that the proportion of the epoxy resin blended in the adhesive composition is 100 mass %.

To the adhesive composition, an acrylic polymer, a urethane-based polymer, a polyester-based polymer, a rubber-based polymer and the like can also be blended when necessary. In this manner, the cohesive force of the adhesive composition can be improved, and the vulnerability can be improved. Acrylic polymers are mainly explained below.

An acrylic polymer is obtained by reacting a monomer component containing a (meth)acrylate.

The (meth)acrylate means an alkyl methacrylate and/or an alkyl acrylate. Specific examples thereof include alkyl (meth)acrylates having 1 to 20 carbon atoms such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, n-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate and eicosyl (meth)acrylate and the like.

Examples of the (meth)acrylate include preferably an alkyl (meth)acrylate having 2 to 14 carbon atoms, more preferably an alkyl (meth)acrylate having 4 to 9 carbon atoms. A kind of (meth)acrylate can be used alone, or two or more kinds thereof can also be used in combination.

The proportion of the (meth)acrylate blended based on the monomer component is, for example, 70 mass % or more, preferably 80 mass % or more.

Moreover, the proportion of the (meth)acrylate blended based on the monomer component is, for example, 99 mass % or less, preferably 98 mass % or less.

The monomer component can also further contain a copolymerizable monomer which can be copolymerized with the (meth)acrylate.

Examples of the copolymerizable monomer include: carboxyl group-containing monomers or acid anhydrides thereof such as (meth)acrylic acid, itaconic acid, maleic acid, crotonic acid and maleic anhydride; hydroxyl group-containing (meth)acrylates such as 2-hydroxyethyl (meth)acrylate and 3-hydroxypropyl (meth)acrylate; amide group-containing monomers such as (meth)acrylamide, N,N-dimethyl (meth)acrylamide, N-methylol (meth)acrylamide, N-methoxymethyl (meth)acrylamide and N-butoxymethyl (meth)acrylamide; vinyl esters such as vinyl acetate; aromatic vinyl compounds such as styrene and vinyl toluene; e.g., (meth)acrylonitrile; e.g., N-(meth)acryloylmorpholine; and e.g., N-vinyl-2-pyrrolidone.

Examples of the copolymerizable monomer include preferably a carboxyl group-containing monomer or a hydroxyl group-containing (meth)acrylate, more preferably (meth)acrylic acid or 2-hydroxyethyl (meth)acrylate.

A kind of the copolymerizable monomers can be used alone, or two or more kinds thereof can also be used in combination. A combination use of a carboxyl group-containing monomer and a hydroxyl group-containing (meth)acrylate is preferably specified, and a combination use of (meth)acrylic acid and 2-hydroxyethyl (meth)acrylate is more preferably specified.

The proportion of the copolymerizable monomer blended based on 100 parts by mass of the (meth)acrylate is, for example, 0.1 parts by mass or more, preferably 0.3 parts by mass or more.

Moreover, the proportion of the copolymerizable monomer blended based on 100 parts by mass of the (meth)acrylate is, for example, 15 parts by mass or less, preferably 10 parts by mass or less.

To react the monomer component, for example, the (meth)acrylate and the copolymerizable monomer when necessary are blended to prepare the monomer component, and the resultant is subjected to, for example, a known polymerization method such as solution polymerization, bulk polymerization, emulsion polymerization and various types of radical polymerization.

Examples of the polymerization method include preferably solution polymerization.

In solution polymerization, for example, the monomer component and a polymerization initiator are blended in a solvent to prepare a monomer solution, and then the monomer solution is heated.

Examples of the solvent include organic solvents and the like. Examples of the organic solvents include: aromatic solvents such as toluene, benzene and xylene; ether-based solvents such as ethyl acetate; ketone-based solvents such as acetone and methyl ethyl ketone; ester-based solvents such as ethyl acetate; and amide-based solvents such as N,N-dimethylformamide.

A kind of the solvents can be used alone, or two or more kinds thereof can also be used in combination. A combination use of an aromatic solvent and an ether-based solvent is preferably specified.

The proportion of the solvent blended based on 100 parts by mass of the monomer component is, for example, 10 parts by mass or more, preferably 50 parts by mass or more.

Moreover, the proportion of the solvent blended based on 100 parts by mass of the monomer component is, for example, 1000 parts by mass or less, preferably 500 parts by mass or less.

Examples of the polymerization initiator include peroxide-based polymerization initiators, azo-based polymerization initiators and the like.

Examples of the peroxide-based polymerization initiators include organic peroxides such as peroxycarbonate, ketone peroxides, peroxyketals, hydroperoxide, dialkyl peroxides, diacyl peroxide and peroxyesters.

Examples of the azo-based polymerization initiators include azo compounds such as 2,2'-azobisisobutyronitrile, 2,2'-azobis(2-methylbutyronitrile), 2,2'-azobis(2,4-dimethylvaleronitrile) and dimethyl 2,2'-azobisisobutyrate.

Examples of the polymerization initiator include preferably an azo-based polymerization initiator.

The proportion of the polymerization initiator blended based on 100 parts by mass of the monomer component is, for example, 0.01 parts by mass or more, preferably 0.05 parts by mass or more.

Moreover, the proportion of the polymerization initiator blended based on 100 parts by mass of the monomer component is, for example, 5 parts by mass or less, preferably 3 parts by mass or less.

The heating temperature is, for example, 50° C. or higher and 80° C. or lower.

The heating period is, for example, an hour or longer and 24 hours or shorter.

In this manner, the monomer component is polymerized, and an acrylic polymer solution containing an acrylic polymer is obtained.

The acrylic polymer solution is blended in the epoxy resin in such a manner that the proportion of the acrylic polymer blended based on 100 parts by mass of the adhesive composition becomes, for example, 20 parts by mass or more, preferably 30 parts by mass or more.

Moreover, the acrylic polymer solution is blended in the epoxy resin in such a manner that the proportion of the acrylic polymer blended based on 100 parts by mass of the adhesive composition becomes, for example, 90 parts by mass or less, preferably 80 parts by mass or less.

Furthermore, the proportion of the acrylic polymer blended based on 100 parts by mass of the epoxy resin is, for example, 50 parts by mass or more, preferably 150 parts by mass or more, more preferably 200 parts by mass or more.

Moreover, the proportion of the acrylic polymer blended based on 100 parts by mass of the epoxy resin is, for example, 300 parts by mass or less, preferably 250 parts by mass or less.

When the proportion of the acrylic polymer blended is the lower limit or more, the proportion can improve the cohesive force of the adhesive composition and consequently the adhesiveness, so that the peel adhesiveness of the adhesive layer 1 can be improved.

When the proportion of the acrylic polymer blended is the upper limit or less, curing is possible.

Examples of the urethane-based polymer include polycarbonate-based polyurethane, polyester-based polyurethane, polyether-based polyurethane and the like.

The polyester-based polymer is typically a polymer having a structure formed by condensation of a polycarboxylic acid such as dicarboxylic acid or a derivative thereof (also called a "polycarboxylic acid monomer" below) and a polyhydric alcohol such as a diol or a derivative thereof (a "polyhydric alcohol monomer" below).

The polycarboxylic acid monomer is not particularly limited. For example, adipic acid, azelaic acid, dimer acid, sebacic acid, 1,4-cyclohexanedicarboxylic acid, 1,3-cyclohexanedicarboxylic acid, 1,2-cyclohexanedicarboxylic acid, 4-methyl-1,2-cyclohexanedicarboxylic acid, dodecenylsuccinic anhydride, fumaric acid, succinic acid, dodecanedioic acid, hexahydrophthalic anhydride, tetrahydrophthalic anhydride or the like, maleic acid, maleic anhydride, itaconic acid, citraconic acid, derivatives thereof and the like can be used therefor. A kind of the polycarboxylic acid monomers can be used alone or a combination of two or more kinds thereof can be used.

The polyhydric alcohol monomer is not particularly limited. For example, ethylene glycol, 1,2-propyleneglycol, 1,3-propanediol, 2-methyl-1,3-propanediol, 1,2-butanediol, 1,3-butanediol, 1,4-butanediol, 1,5-pentanediol, 1,6-hexanediol, 3-methyl-1,5-pentanediol, neopentylglycol, diethyleneglycol, dipropyleneglycol, 2,2,4-trimethyl-1,5-pentanediol, 2-ethyl-2-butylpropanediol, 1,9-nonanediol, 2-methyloctanediol, 1,10-decanediol, derivatives thereof and the like can be used.

A kind of the polyhydric alcohol monomers can be used alone or a combination of two or more kinds thereof can be used.

Examples of the rubber-based polymer include: isobutylene-based polymers such as polyisobutylene (PIB), a copolymer of isobutylene and normal butylene, a copolymer of isobutylene and isoprene (for example, butyl rubbers such as regular butyl rubber, chlorinated butyl rubber, brominated butyl rubber and partially cross-linked butyl rubber) and vulcanized materials thereof; styrene-based thermoplastic elastomers including styrene-based block copolymers such as a styrene-ethylene-butylene-styrene block copolymer (SEBS), a styrene-isoprene-styrene block copolymer (SIS), isoprene rubber (IR), a styrene-butadiene-styrene block copolymer (SBS), a styrene-ethylene-propylene-styrene block copolymer (SEPS, hydrogenated SIS), a styrene-ethylene-propylene block copolymer (SEP, a hydrogenated styrene-isoprene block copolymer), a styrene-isobutylene-styrene block copolymer (SIBS) and styrene-butadiene rubber (SBR) and the like; synthetic butyl rubber (IIR), recycled butyl rubber, butadiene rubber (BR), acrylonitrile-butadiene rubber (NBR), EPR (binary ethylene-propylene rubber), EPT (ternary ethylene-propylene rubber), acrylic rubber, urethane rubber, silicon rubber and the like.

A small amount of a curing agent can also be blended in the adhesive composition. In this manner, the cohesive force of the adhesive layer 1 can be improved. Examples of the curing agent will be described below.

The proportion of the curing agent blended is adjusted to a proportion which improves the peel adhesiveness of the adhesive layer 1 and which slightly cures (does not fully cure) the adhesive composition.

The proportion of the curing agent blended based on 100 parts by mass of the epoxy resin is specifically, for example, 0.05 parts by mass or more, preferably 0.15 parts by mass or more.

Moreover, the proportion of the curing agent blended based on 100 parts by mass of the epoxy resin is, for example, 5 parts by mass or less, preferably 3 parts by mass or less.

In a case where the curing agent is an imidazole compound described below, the proportion thereof blended based on 100 parts by mass of the epoxy resin is specifically, for example, 0.05 parts by mass or more, preferably 0.15 parts by mass or more and, for example, 5 parts by mass or less, preferably 3 parts by mass or less.

If the proportion of the curing agent blended is the lower limit or more, the peel adhesiveness of the adhesive layer 1 can be improved. If the proportion of the curing agent blended is the upper limit or less, the adhesive layer 1 is prevented from being fully cured, and a decrease in the reactivity of the adhesive layer 1 and the curing agent layer 3 can be suppressed. Thus, a cured layer 5 described below can be formed with higher reliability.

To obtain the adhesive composition, for example, the epoxy resin is blended with various polymers (an acrylic polymer solution, a urethane-based polymer solution, a polyester-based polymer solution, a rubber-based polymer solution and the like) and/or the curing agent when necessary and diluted with a solvent when necessary, and thus a varnish is prepared.

The solvent may be a solvent in which the adhesive composition can dissolve, and examples thereof include the solvents described above. Examples of the solvent include preferably a ketone-based solvent.

The concentration of the adhesive composition in the varnish is, for example, 20 mass % or more, preferably 40 mass % or more.

Moreover, the concentration of the adhesive composition in the varnish is, for example, 80 mass % or less, preferably 70 mass % or less.

In a case where an acrylic polymer, a urethane-based polymer, a polyester-based polymer, a rubber-based polymer or the like (also simply called a polymer below) is blended in the adhesive composition, a cross-linking agent can also be blended when the adhesive composition is prepared.

Examples of the cross-linking agent include isocyanate-based cross-linking agents, aziridine-based cross-linking agents, epoxy-based cross-linking agents, metal chelate-based cross-linking agents and the like, and include preferably isocyanate-based cross-linking agents and epoxy-based cross-linking agents.

Examples of the isocyanate-based cross-linking agents include: aromatic isocyanates such as tolylene diisocyanate and xylylene diisocyanate; alicyclic isocyanates such as isophorone diisocyanate; and aliphatic isocyanates such as hexamethylene diisocyanate.

More specific examples thereof include: lower aliphatic polyisocyanates such as butylene diisocyanate and hexamethylene diisocyanate; alicyclic isocyanates such as cyclopentylene diisocyanate, cyclohexylene diisocyanate and isophorone diisocyanate; aromatic diisocyanates such as 2,4-tolylene diisocyanate, 4,4'-diphenylmethane diisocyanate, xylylene diisocyanate and polymethylene polyphenyl isocyanate; isocyanate adducts such as a trimethylolpropane/tolylene diisocyanate trimer adduct (manufactured by Tosoh Corporation, trade name Coronate L); a trimethylolpropane/hexamethylene diisocyanate trimer adduct (manufactured by Tosoh Corporation, trade name Coronate HL); and isocyanurate of hexamethylene diisocyanate (manufactured by Tosoh Corporation, trade name Coronate HX); a trimethylolpropane adduct of xylylene diisocyanate (manufactured by Mitsui Chemicals, Inc., trade name D110N); a trimethylolpropane adduct of hexamethylene diisocyanate (manufactured by Mitsui Chemicals, Inc., trade name D160N); polyether polyisocyanate, polyester polyisocyanate and adducts thereof with various polyols; polyisocyanates multifunctionalized with an isocyanurate bond, a biuret bond, an allophanate bond or the like.

Epoxy-based cross-linking agents are multifunctional epoxy compounds having two or more epoxy groups in one molecule. Examples of the epoxy-based cross-linking agents include bisphenol A, epichlorohydrin epoxy-based resins, ethylene glycidyl ether, N,N,N',N'-tetraglycidyl-m-xylenediamine, diglycidylaniline, diamine glycidyl amine, 1,3-bis (N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, glycerin diglycidyl ether, glycerin triglycidyl ether, polyglycerol polyglycidyl ether, sorbitan polyglycidyl ether, trimethylolpropane polyglycidyl ether, diglycidyl adipate, diglycidyl o-phthalate, triglycidyl-tris(2-hydroxyethyl)isocyanurate, resorcin diglycidyl ether and bisphenol-S-diglycidyl ether as well as epoxy-based resins having two or more epoxy groups in the molecule and the like. As the epoxy-based cross-linking agent, for example, trade names "Tetrad C" and "Tetrad X" manufactured by Mitsubishi Gas Chemical Company, Inc. can be used.

The proportion of the cross-linking agent blended based on 100 parts by mass of the polymer is, for example, 0.5 parts by mass or more, preferably 5 parts by mass or more.

Moreover, the proportion of the cross-linking agent blended based on 100 parts by mass of the polymer is, for example, 20 parts by mass or less, preferably 15 parts by mass or less.

In this manner, the adhesive composition is prepared.

Then, the adhesive composition is applied to a surface of the release liner 10 and then dried.

The release liner 10 is, for example, a release sheet having an approximately rectangular flat plate shape, and the top surface and the bottom surface are formed flat.

For example, the release liner 10 is formed into a film with a resin material: e.g., polyolefin (specifically, polyethylene or polypropylene); vinyl polymers such as ethylene/vinyl acetate copolymer (EVA); e.g., polyesters including polyethylene terephthalate, polycarbonate and the like; and e.g., fluorine resins including polytetrafluoroethylene and the like.

The release liner 10 can also be formed with a metal material such as iron, aluminum, or stainless steel.

Examples of the release liner 10 include preferably a polyester film, more preferably a polyethylene terephthalate film.

The surface of the release liner 10 may be subjected to appropriate release treatment, for example, by providing a release-treated layer of a long-chain alkyl or silicone when necessary.

The thickness of the release liner 10 is, for example, 10 μm or more and 1000 μm or less.

Examples of the application method include an applicator method, a doctor blade method, a roll method, a screen method, a gravure method, a spraying method and the like.

Regarding the heating conditions, the heating temperature is, for example, 70° C. or higher and 160° C. or lower. The heating period is, for example, one minute or longer and five minutes or shorter.

In a case where the adhesive composition contains the cross-linking agent, aging treatment may be conducted in which the polymer is cross-linked with the cross-linking agent by further heating after the heating, depending on the kind of the cross-linking agent.

The temperature of the further heating is, for example, 30° C. or higher and 60° C. or lower. The heating period is, for example, an hour or longer, preferably a day or longer and, for example, seven days or shorter.

In a case where the adhesive composition contains the curing agent, the heating temperature is, for example, 70° C.

or higher and 160° C. or lower. Moreover, the heating period is five minutes or longer and five hours or shorter. In this manner, the entire curing agent reacts with a part of the epoxy resin.

Thus, the adhesive layer 1 is formed on the surface of the release liner 10 from the adhesive composition.

Figure 2:
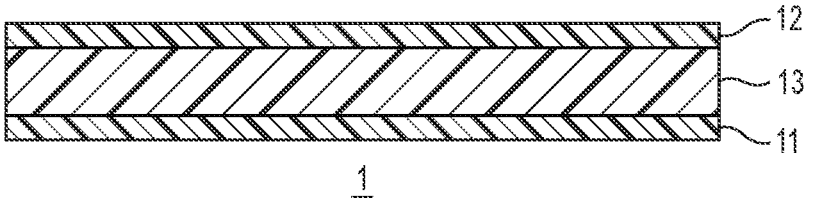
FIG. 2 is a cross-sectional view of adhesive layers in an aspect in which a first adhesive layer and a second adhesive layer are provided on a first base material layer.

The adhesive layer 1 may also be formed on the surface of the release liner 10 with a structure having a first adhesive layer 11, a first base material layer 13 and a second adhesive layer 12 in this order toward the top (in one thickness direction) as illustrated in FIG. 2. In other words, the adhesive layer 1 may also be formed on the surface of the release liner 10 as a structure having the first base material layer 13 and the second adhesive layer 12 and the first adhesive layer 11, which are respectively placed on both vertical surfaces of the first base material layer 13.

Alternatively, the adhesive layer 1 may be formed by providing the first adhesive layer 11 and the second adhesive layer 12 on both surfaces of the first base material layer 13, respectively, without using the release liner 10.

The first base material layer 13 is a support layer giving toughness to the adhesive layer 1 and has an approximately flat plate (sheet) shape extending along the face direction of the adhesive layer 1.

The first base material layer 13 may have either softness or hardness. Moreover, the first base material layer 13 may also contain bubbles. Furthermore, the first base material layer 13 may be a porous sheet penetrating through the thickness direction through porous treatment. A specific example of the porous sheet includes a foam sheet. In this case, the adhesive layer comes to include a porous sheet impregnated with an adhesive composition containing an epoxy resin as a main component.

The material of the foam sheet is, for example, of an amorphous cross-linked type, and examples thereof include: resins such as polyurethane, polyolefin (polyethylene, polypropylene, a copolymer thereof and the like), silicone and acryl; and e.g. rubber.

Examples of the material of the foam sheet include preferably a resin, more preferably polyurethane or polyolefin, further preferably polyurethane.

Polyurethane has low compression hardness and can easily deform along a step and match an adherent having a step (excellent step-matching property). Examples of the foam type of the foam sheet include continuous foam type, independent foam type and the like. Continuous foam type is preferable in view of the permeability of the curing agent component liquid.

The porous sheet is not particularly limited as long as the porous sheet has plural pores, and examples thereof include a nonwoven cloth and the like in addition to the foam sheet. Examples of such a nonwoven cloth include a nonwoven polyester cloth and the like.

In a case where the first base material layer 13 is a porous sheet, an aspect in which the adhesive layer 1 forms a multilayer structure as illustrated in FIG. 2 and in which the adhesive composition is contained in the plural pores existing in the first base material layer 13 may also be used. In this aspect, the adhesive composition is in the plural pores and on both vertical surfaces of the first base material layer 13. To produce the adhesive layer 1 in this aspect, for example, after impregnating the porous sheet with the adhesive composition, the solvent is evaporated.

Alternatively, in a case where the first base material layer 13 is a porous sheet, the adhesive layer 1 does not have a multilayer structure as illustrated in FIG. 2 but may have a single layer structure containing the adhesive composition in the plural pores existing in the first base material layer 13.

The first base material layer 13 is more preferably a porous sheet because the adhesive layer 1 can be cured by allowing the curing agent contained in the curing agent layer 3 described below to permeate the plural pores in the first base material layer 13 or the adhesive composition existing on both vertical surfaces of the first base material layer 13 through the plural pores.

The thickness of the first base material layer 13 is, for example, 2 μm or more, preferably 10 μm or more. Moreover, the thickness of the first base material layer 13 is, for example, 75 μm or less, preferably 50 μm or less.

When the first base material layer 13 is a foam sheet, the thickness thereof is, for example, 0.5 mm or more, preferably 1 mm or more and, for example, 8 mm or less, preferably 5 mm or less. When the thickness of the first base material layer 13 is the lower limit or more, the step-matching property is excellent.

When the adhesive layer 1 is in the aspect of a single layer structure containing the adhesive composition in the plural pores existing in the first base material layer 13 described above, the thickness of the first base material layer 13 and the thickness of the adhesive layer 1 are the same or approximately the same.

Various types of physical properties of the first base material layer 13 are appropriately determined in accordance with the first adherend 2 and the second adherend 4, and are not particularly limited.

The thickness of the adhesive layer 1 before curing is, for example, 3 μm or more, preferably 5 μm or more, more preferably 10 μm or more. Moreover, the thickness of the adhesive layer 1 before curing is, for example, 100 μm or less, preferably 80 μm or less, more preferably 70 μm or less.

A thickness of the adhesive layer 1 before curing of 3 μm or more is advantageous in view of securing the adhesiveness and in view of the unevenness-matching property.

Moreover, a thickness of 100 μm or less in the adhesive layer 1 before curing is advantageous because the curing agent explained below easily permeates the adhesive layer 1 to thus improve the curing rate.

When necessary, a separate release liner (not illustrated) can also be placed on (brought into contact with) the surface of the adhesive layer 1 (the surface opposite to the contact surface in contact with the release liner 10). That is, the adhesive layer 1 can also be sandwiched between two release liners.

The adhesive layer 1 has pressure-sensitive adhesiveness (stickiness or initial adhesiveness).

Then, the adhesive layer 1 is transferred from the release liner 10 to a surface of the first adherend 2. Specifically, the adhesive layer 1 is first brought into contact with the first adherend 2, and subsequently, the release liner 10 is peeled from the adhesive layer 1 as indicated with the arrow in FIG. 1A.

The release liner 10 can also be peeled from the adhesive layer 1 just before the step (3) after the step (2).

In a case where the adhesive layer 1 is sandwiched between two release liners, for example, a release liner is first peeled off. Next, the exposed surface of the exposed adhesive layer 1 is brought into contact with the first adherend 2, and subsequently, the release liner 10 is peeled from the adhesive layer 1 as indicated with the arrow in FIG. 1A.

The first adherend 2 is not particularly restricted, and examples thereof include metal, glass, plastic, a porous material such as slate and a nonwoven cloth, mortar, concrete, rubber, wood, leather, fabric, paper and the like.

Examples of the first adherend 2 include preferably metal, slate, mortar or concrete.

In this manner, the adhesive layer 1 is placed on the first adherend 2 as illustrated in FIG. 1A.

Step (2) of (i)

The curing agent layer 3 is a layer which can cure the adhesive layer 1 by reacting with the adhesive layer 1, extends along the face direction (the direction perpendicular to the thickness direction) and has an approximately flat plate shape having a flat front surface and a flat back surface.

In the step (2), the curing agent layer 3 is placed on the second adherend 4 as illustrated in FIG. 1A.

To place the curing agent layer 3 on the second adherend 4, for example, a curing agent component is first prepared.

The curing agent component contains a curing agent.

The curing agent used in the embodiment is a polymerization catalyst type curing agent. The polymerization catalyst type curing agent is a compound which catalyzes the self-polymerization reaction of epoxy groups as it is well known. The polymerization catalyst type curing agent causes, for example, the following three-stage reaction as a function thereof: an adduct with an epoxy resin is formed in a first stage; an ion body thereof is formed by further adding it to the epoxy resin in a second stage; and a polymerization reaction between the epoxy resins is initiated in a third stage.

Examples of the polymerization catalyst type curing agent include tertiary amines, quaternary ammonium salts, phosphines, phosphonium salts, imidazole compounds and the like. Of these, imidazole compounds are preferable because the curing rate is fast.

Examples of the imidazole compounds include methylimidazole, 2-ethyl-4-methylimidazole, 1-isobutyl-2-methylimidazole (IBMI12), 1-benzyl-2-methylimidazole (1B2MZ), 1,2-dimethylimidazole (1,2DMZ), 1-butylimidazole (1BZ), 1-decyl-2-methylimidazole (1D2MZ), 1-octylimidazole (1OZ), 2-ethyl-4-methylimidazole, ethylimidazole, isopropylimidazole, 2,4-dimethylimidazole (2E4MZ), 1-phenylimidazole (1PZ), undecylimidazole, heptadecylimidazole, 2-phenyl-4-methylimidazole, 2-phenyl-4,5-dihydroxymethylimidazole, 2-phenyl-4-methyl-5-hydroxymethylimidazole and the like, and an imidazole compound substituted at position 1 is preferable in view of the curing rate.

A kind of curing agent can be used alone, or two or more kinds thereof can also be used in combination.

The proportion of the curing agent blended based on the curing agent component is, for example, 10 mass % or more, preferably 30 mass % or more, more preferably 50 mass % or more, further preferably 60 mass % or more, further more preferably 80 mass % or more.

Moreover, the proportion is, for example, 100 mass % or less, preferably 90 mass % or less. The proportion of the curing agent blended based on the curing agent component is particularly preferably 60 mass % or more and 90 mass % or less. When the proportion of the curing agent blended is the lower limit or more, the adhesive layer 1 has excellent adhesiveness.

The epoxy resin may be blended in the curing agent component when necessary.

The proportion of the epoxy resin blended based on 100 parts by mass of the curing agent is 30 parts by mass or more, preferably 40 parts by mass or more. Moreover, the proportion of the epoxy resin blended based on 100 parts by mass of the curing agent is, for example, 70 parts by mass or less, preferably 60 parts by mass or less.

When the proportion of the epoxy resin blended is the upper limit or less, the curing agent can be prevented from almost entirely reacting with the epoxy resin in the curing agent layer 3 in the step (2), and the reactivity of the curing agent layer 3 (the curing agent thereof) to the adhesive layer 1 (the epoxy resin thereof) can be prevented from decreasing in the step (3).

A reaction diluent, a metal catalyst or the like can also be blended in the curing agent component according to the need.

The reaction diluent is, for example, glycidyl ether or the like and may be monofunctional or multifunctional. Examples of the metal catalyst include organometallic compounds of Al, Sn, Zr, Fe or the like.

The proportion of the reaction diluent blended based on 100 parts by mass of the curing agent is, for example, 1 part by mass or more, preferably 5 parts by mass or more. Moreover, the proportion of the reaction diluent blended based on 100 parts by mass of the curing agent is, for example, 80 parts by mass or less, preferably 50 parts by mass or less.

The proportion of the metal catalyst blended based on 100 parts by mass of the curing agent is 0.01 parts by mass or more, preferably 0.1 parts by mass or more. Moreover, the proportion of the metal catalyst blended based on 100 parts by mass of the curing agent is, for example, 10 parts by mass or less, preferably 5 parts by mass or less.

To prepare the curing agent component, the curing agent is blended with the epoxy resin, the reaction diluent, the metal catalyst or the like when necessary, and a curing agent component liquid is prepared.

When the curing agent is solid, the curing agent is dissolved in a solvent when necessary, and the curing agent component liquid is thus prepared.

The solvent may be a solvent in which the adhesive composition can dissolve, and examples thereof include the solvents described above.

The concentration of the curing agent component in the curing agent component liquid is, for example, 10 mass % or more, preferably 20 mass % or more.

Moreover, the concentration of the curing agent component in the curing agent component liquid is, for example, 100 mass % or less, preferably 50 mass % or less.

In this manner, the curing agent component is prepared.

Then, the curing agent component is applied to the second adherend 4. Specifically, the curing agent component liquid is applied to the second adherend 4.

The second adherend 4 is not particularly restricted but is the adherend described above or the like.

In a case where the second adherend 4 is a porous material, the curing agent contained in the curing agent layer 3 permeates the porous material, and as a result, the reaction of the adhesive layer and the curing agent layer (the curing agent) may be inhibited. Accordingly, in a case where the means of (i) is used, the second adherend 4 is preferably a material other than porous materials, and in a case where a porous material is used as the second adherend 4, the means of (ii) described below is preferably used.

The application method is the method described above or the like.

Then, the excessive curing agent component liquid on the surface of the second adherend 4 is removed when necessary. For example, the excessive curing agent component liquid on the surface of the second adherend 4 is wiped off.

In this manner, the curing agent layer 3 is formed on the surface of the second adherend 4, and the curing agent layer 3 is placed on the second adherend 4.

In this manner, a bonding kit 7 having the adhesive layer 1 placed on the first adherend 2 and the curing agent layer 3 placed on the second adherend 4 is structured.

Step (3) of (i)

In the step (3), the adhesive layer 1 and the curing agent layer 3 are placed in such a manner that the layers are sandwiched between the first adherend 2 and the second adherend 4 as illustrated in FIG. 1B. That is, the adhesive layer 1 and the curing agent layer 3 are overlapped with each other between the first adherend 2 and the second adherend 4. Then, the adhesive layer 1 and the curing agent layer 3 react with each other by an effect of the curing agent. Examples of the effect of the curing agent include the effect the curing agent to permeate the adhesive layer 1 and the like.

Figure 3:
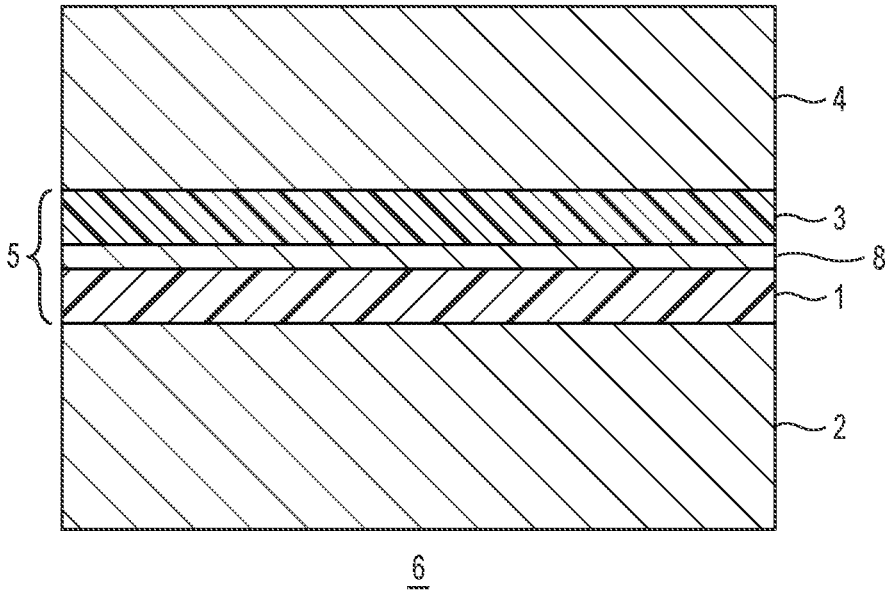
FIG. 3 is a view for explaining an embodiment in which a second base material layer is provided between the adhesive layer and the curing agent layer before curing.

In this regard, FIG. 1B illustrates an aspect in which the adhesive layer 1 and the curing agent laver 3 are in contact with each other, but the invention is not limited thereto. As long as the curing agent contained in the curing agent layer 3 acts on (permeates) the adhesive layer 1, a second base material layer 8 may be provided between the adhesive layer 1 and the curing agent layer 3 as illustrated in FIG. 3.

The reaction temperature is, for example, normal temperature.

When necessary, the adhesive layer 1 and the curing agent layer 3 may be heated, and the heating temperature is, for example, 50° C. or higher, preferably 70° C. or higher. Moreover, the heating temperature is, for example, 130° C. or lower, preferably 110° C. or lower.

The reaction temperature is preferably normal temperature. The normal temperature is a temperature without the heating for reacting the adhesive layer 1 and the curing agent layer 3 (for example, heating at 50° C. or higher) and is, for example, lower than 50° C., preferably 40° C. or lower and, for example, 10° C. or higher, preferably 20° C. or higher.

When the reaction temperature is normal temperature, heating for reacting the adhesive layer 1 and the curing agent layer 3 is not required, and the first adherend 2 and the second adherend 4 can be adhered further simply.

The reaction period is, for example, an hour or longer, preferably 12 hours or longer. Moreover, the reaction period is, for example, 96 hours or shorter, preferably 48 hours or shorter.

Thus, the adhesive layer 1 is cured to turn into the cured layer 5. Preferably, the adhesive layer 1 is cured at normal temperature.

The thickness of the cured layer 5 (in a case where the cured layer 5 includes the first base material layer 13 and the second base material layer 8, the thickness excludes those of the layers) is preferably 3 μm or more, more preferably 15 μm or more. Moreover, the thickness of the cured layer 5 is preferably 150 μm or less, more preferably 120 μm or less.

In this regard, although there is a boundary between the adhesive layer 1 and the curing agent layer 3 in FIG. 1B, the cured layer 5 is a layer integrally formed with the adhesive layer 1 and the curing agent layer 3 through reaction, and the boundary does not exist.

The first adherend 2 and the second adherend 4 are bonded with the cured layer 5.

The shear bond strength of the cured layer 5 is, for example, 0.1 MPa or more, preferably 0.4 MPa or more, more preferably 0.6 MPa or more, further preferably 0.7 MPa or more, particularly preferably 1.0 MPa or more, most preferably 2.3 MPa or more, further preferably 2.5 MPa or more, further preferably 3.5 MPa or more.

If the shear bond strength of the cured layer 5 is the lower limit or more, the adhesive layer has excellent adhesiveness and can bond the first adherend 2 and the second adherend 4 with higher reliability.

The shear bond strength of the cured layer 5 is measured by the following method. One polyethylene terephthalate film on the adhesive layer 1 sandwiched between two polyethylene terephthalate films which have been subjected to release treatment is peeled from the adhesive layer 1, and the adhesive layer 1 after peeling is placed on a first slate plate. Then, the other polyethylene terephthalate film is peeled from the adhesive layer 1. Separately, the curing agent layer 3 is placed on a second slate plate.

Next, the adhesive layer 1 and the curing agent layer 3 are brought into contact with each other in such a manner that the layers are sandwiched between the first slate plate and the second slate plate and left for 24 hours to form the cured layer 5. Then, the first slate plate and the second slate plate are pulled in the shear direction at a speed of 5 mm/minute, and the strength at which the two slate plates peeled off is determined to be the shear bond strength.

In the above steps, a bonded structure 6 is produced.

That is, the bonded structure 6 has the first adherend 2, the second adherend 4 facing the first adherend 2 and the cured layer 5 sandwiched between the adherends. In the bonded structure 6, the first adherend and the second adherend are strongly bonded with the cured layer 5.

Next, the means (ii) for providing the adhesive layer and the curing agent layer is explained. The means (ii) is means for placing an adhesive layer on a first adherend, providing on the adhesive layer a curing agent layer which can cure the adhesive layer by reacting with the adhesive layer and then placing a second adherend thereon.

The means (ii) is the same as the embodiment of the means (i) except that the curing agent layer is provided on the adhesive layer, but not on the second adherend, and preferable embodiments are also the same.

In the cured layer 5, the second base material layer 8 may be provided around the middle of the cured layer 5 in the thickness direction as illustrated in FIG. 3. That is, the second base material layer 8 may be provided between the adhesive layer 1 and the curing agent layer 3 before curing. The second base material layer 8 gives toughness to the cured layer.

For example, both in the means (i) and in the means (ii), the curing agent layer 3 may be placed on the second base material layer 8 while the second base material layer 8 is on the adhesive layer 1. Alternatively, the adhesive layer 1 may be placed on the second base material layer 8 with the second base material layer 8 provided on the curing agent layer 3.

As the material of the second base material layer 8, the same materials as those of the first base material layer 13 provided in the adhesive layer 1 can be used. The second base material layer 8 is preferably a porous sheet, because the curing agent contained in the curing agent layer 3 can permeate the adhesive layer 1 through the second base material layer 8 to be thus able to cure the adhesive layer 1.

The thickness of the second base material layer 8 is appropriately determined in accordance with the first adherend 2 and the second adherend 4 and is not particularly limited, but the thickness is, for example, 2 μm or more, preferably 10 μm or more. Moreover, the thickness of the second base material layer 8 is, for example, 75 μm or less, preferably 50 μm or less.

The bonding method in the embodiment is characterized in that the thickness A (m) of the adhesive layer before curing and the application amount B (kg/m²) of the curing agent contained in the curing agent layer satisfy the expression (1) below:

$$5 < B/A < 900 \tag{1}$$

Here, the application amount B (kg/m²) of the curing agent contained in the curing agent layer means the amount (kg) of the curing agent per the application area (m²) of the curing agent.

The application area of the curing agent is equal to the area of the main surface of the curing agent layer formed by application of the curing agent and also equal to the area of the main surface of the adhesive layer. Accordingly, the B/A in the expression (1) is equal to the value obtained by dividing the amount (kg) of the curing agent in the curing agent layer by the volume (m³) of the adhesive layer.

Since the B/A satisfies the expression (1), the first adherend and the second adherend can be adhered simply and strongly. Moreover, unevenness of curing of the obtained bonded structure can be prevented, and undesired fluctuation of the physical properties can be inhibited.

If the B/A is 5 or less, desired adhesiveness by the curing agent is not exhibited.

If the B/A is 900 or more, the curing agent is excessive. Thus, the adhesive layer becomes tacky, and unevenness of curing is caused easily.

In order that the B/A satisfies the expression (1), for example, there is means, for example, using a method which can apply the curing agent component liquid with an adjusted curing agent component concentration in a certain amount using tools such as a sprayer, a roller and a wire bar.

In this regard, in a case where one of the adherends is a porous material such as slate, the adhesive layer and the curing agent layer are preferably provided using the means (ii) to satisfy the expression (1). In this manner, even when an adherend is a porous material, the curing agent is not prevented from permeating the adhesive layer due to undesirable permeation to the porous material, and the curing agent can quantitatively act on (permeate) the adhesive layer.

The B/A (kg/m³) is preferably greater than 6 kg/m³, more preferably greater than 30 kg/m³, further preferably greater than 100 kg/m³.

Moreover, the B/A is preferably smaller than 600 kg/m³, more preferably smaller than 500 kg/m³, further preferably smaller than 400 kg/m³.

The unevenness of curing can be evaluated with the elastic modulus (Pa) of the adhesive layer 1 after curing.

Specifically, it can be determined that curing of the adhesive layer 1 has advanced sufficiently and that curing is not uneven when the elastic modulus (Pa) of the adhesive layer 1 after curing is $5 \times 10^7$ (Pa) or more under the condition after lapse of 48 hours at room temperature (25° C.).

The elastic modulus (Pa) of the adhesive layer 1 after curing is more preferably $5 \times 10^7$ (Pa) or more, further preferably $1 \times 10^8$ (Pa) or more, particularly preferably $5 \times 10^8$ (Pa) or more.

Moreover, the elastic modulus (Pa) of the adhesive layer 1 after curing is preferably 10 times or more, more preferably 100 times or more, further preferably 10000 times or more the elastic modulus (Pa) of the adhesive layer 1 before curing.

In this regard, the elastic moduli (Pa) of the adhesive layer 1 before curing and after curing mean the values measured by the method described in the Examples.

EXAMPLES

The invention is explained further specifically below referring to Examples and Comparative Examples. Here, the invention is not limited at all by the Examples and the Comparative Examples.

Specific values such as the blended proportions (contained proportions), the physical property values and the parameters used in the following descriptions can be replaced with the upper limits (the values defined with "or less" or "less than") or the lower limits (the values defined with "or more" or "exceed") of the corresponding blended proportions (contained proportions), physical property values, parameters and the like described in "DESCRIPTION OF EMBODIMENTS" above.

Moreover, the "liquid" and the "solid" are properties at normal temperature (25° C.).

The "parts" and "%" are based on mass unless otherwise specified.

Examples 1 to 12 and Comparative Examples 1 and 2

A liquid bisphenol A epoxy resin (trade name "jER828", manufactured by Mitsubishi Chemical Corporation), a liquid bisphenol F epoxy resin (trade name "jER806", manufactured by Mitsubishi Chemical Corporation), a solid bisphenol A epoxy resin (trade name "jER1256", manufactured by Mitsubishi Chemical Corporation), a solid bisphenol F epoxy resin (trade name "jER4010P", manufactured by Mitsubishi Chemical Corporation), a liquid multifunctional phenol novolak epoxy resin (trade name "jER152", manufactured by Mitsubishi Chemical Corporation) and a solid special novolak epoxy resin (trade name "jER157s70", manufactured by Mitsubishi Chemical Corporation) were mixed at the combinations and the amounts shown in Table 1 below and diluted with methyl ethyl ketone to an epoxy resin concentration of 65%, and thus adhesive compositions (varnishes) were prepared. The varnishes were applied to release-treated surfaces of polyethylene terephthalate films (PET films) (trade name "Diafoil MRF #38", manufactured by Mitsubishi Chemical Corporation) which were subjected to release treatment with a silicone-based release agent, in such a manner that the thicknesses after drying before curing (the thicknesses of the adhesive layers) became the values shown in Table 2. By heating at 80° C. for three minutes and drying, adhesive layers A to C were obtained. Then, each adhesive layer was brought into contact with another polyethylene terephthalate film in such a manner that the adhesive layer was sandwiched between the two polyethylene terephthalate films, and thus sheets were obtained.

Example 13

A liquid bisphenol A epoxy resin (trade name "jER828", manufactured by Mitsubishi Chemical Corporation), a solid bisphenol A epoxy resin (trade name "jER1256", manufactured by Mitsubishi Chemical Corporation) and a liquid multifunctional phenol novolak epoxy resin (trade name "jER152", manufactured by Mitsubishi Chemical Corporation) were mixed in the amounts shown in Table 1 below and diluted with methyl ethyl ketone to an epoxy resin concentration of 20%, and thus an adhesive composition (varnish) was prepared. A polyurethane foam sheet (trade name: "Claraform 780EA", thickness 3 mm, continuous foam type, manufactured by Kurabo Industries Ltd.), which is a porous sheet, was immersed as a first base material layer in the varnish, and the pores of the polyurethane foam sheet were impregnated with the varnish sufficiently. Then, the polyurethane foam sheet was pulled up from the varnish, and subsequently, methyl ethyl ketone was evaporated by heating at 80° C. An epoxy resin-containing base material sheet (adhesive layer) which contained the epoxy resin inside the plural pores as well as on the upper and lower surfaces was thus obtained. The thickness of the adhesive layer (before curing) shown in Table 2 means the thickness of the entire adhesive layer including the porous sheet.

<Measurement of Elastic Moduli>

Examples 1 to 12 and Comparative Examples 1 and 2

In Examples 1 to 12 and Comparative Examples 1 and 2, the elastic moduli on uncuring were measured as follows. First, a sample piece having a size of 30 mm×30 mm was cut out, and one of the release-treated PET film was peeled off. The exposed adhesive layer was rolled into a cylindrical shape, and a measurement sample was thus produced. The produced measurement sample was subjected to a tensile test with a chuck distance of 10 mm and a tensile rate of 50 mm/min. The initial tensile elastic modulus (Pa) was determined from the slope of the initial part (tangent) of the obtained stress-strain curve.

In Examples 1 to 12 and Comparative Examples 1 and 2, the elastic moduli on curing were measured as follows. First, one of the PET films of the obtained sheet was peeled off, and the curing agent component was applied using a wire bar in the application amount of Table 2 below. The adhesive layer was cured by reacting at normal temperature (25° C.) for 48 hours, and thus a cured layer was obtained. Next, the other PET film of the sheet was peeled off, and a piece was cut out of the sheet after curing with width 10 mm×length 40 mm and subjected to a tensile test with a chuck distance of 10 mm and a tensile rate of 50 mm/min. The initial tensile elastic modulus (Pa) was determined from the slope of the initial part (tangent) of the obtained stress-strain curve.

Example 13

In Example 13, the elastic modulus on uncuring was measured as follows. First, a sample piece having a size of 30 mm×30 mm was cut out and subjected to a compression test with a compression rate of 10 mm/min. The initial tensile elastic modulus (Pa) was determined from the slope of the initial part (until the thickness was compressed from the initial value to 20%) of the obtained stress-strain curve.

In Example 13, the elastic modulus on curing was measured as follows. First, the curing agent component was applied using a sprayer in the application amount of Table 2 below. The adhesive layer was cured by reacting at normal temperature (25° C.) for 48 hours, and thus a cured layer was obtained. Next, a sample piece having a size of 30 mm×30 mm was cut out and subjected to a compression test with a compression rate of 10 mm/min. The initial tensile elastic modulus (Pa) was determined from the slope of the initial part (until the thickness was compressed from the initial value to 20%) of the obtained stress-strain curve.

The results are shown in Table 2. In Table 2, (A)E+(0X) means $A \times 10^{X}$, and (B)E–(0Y) means $B \times 10^{-Y}$. Moreover, "with tackiness" means that unreacted curing agent component remained in the adhesive layer or that tackiness was caused because the adhesive layer did not cure sufficiently. The details of the abbreviations of the curing agents in Table 2 are described below.

1,2DMZ: 1,2-dimethylimidazole
1B2MZ: 1-benzyl-2-methylimidazole
1BZ: 1-butylimidazole
1D2MZ: 1-decyl-2-methylimidazole
1OZ: 1-octylimidazole
2E4MZ: 2,4-dimethylimidazole
IBMI12: 1-isobutyl-2-methylimidazole

TABLE 1

|  |  | Type of Epoxy Resin | Trade Name | Adhesive Layer A | Adhesive Layer B | Adhesive Layer C |
|---|---|---|---|---|---|---|
| Epoxy Resin | Liquid Epoxy Resin | Bisphenol A Epoxy | jER828 | 69 | 45 | — |
|  |  | Bisphenol F Epoxy | jER806 | — | — | 59 |
|  | Solid Epoxy Resin | Bisphenol A Epoxy | jER1256 | 30 | 30 | — |
|  |  | Bisphenol F Epoxy | jER4010P | — | — | 40 |
|  | Multifunctional Epoxy Resin | Phenol Novolak | jER152 | — | 25 | — |
|  |  | Special Novolak Epoxy | jER157S70 | 1 | — | 1 |

TABLE 2

|  |  |  | Example 1 | Example 2 | Example 3 | Example 4 | Example 5 | Example 6 | Example 7 | Example 8 |
|---|---|---|---|---|---|---|---|---|---|---|
| Adhesive Layer | Type |  | A | A | A | A | A | A | A | A |
|  | Thickness (before curing) | μm | 50 | 50 | 50 | 50 | 50 | 50 | 50 | 50 |
| Curing Agent Component | Type of Curing Agent |  | 1,2DMZ | 1B2MZ | 1BZ | 1D2MZ | 1OZ | 2E4MZ | IBMI12 | IBMI12 |
|  | Application Amount of Curing Agent Component | g/m² | 10.4 | 10.4 | 8.9 | 8.9 | 8.9 | 10.8 | 21 | 42 |
|  | Proportion of Curing Agent | % | 80 | 80 | 100 | 100 | 100 | 80 | 100 | 100 |
|  | Application Amount of Curing Agent | g/m² | 8.3 | 8.3 | 8.9 | 8.9 | 8.9 | 8.6 | 21.0 | 42.0 |
| Expression (1) | Thickness of Adhesive Layer (A) | m | 5.0E−05 | 5.0E−05 | 5.0E−05 | 5.0E−05 | 5.0E−05 | 5.0E−05 | 5.0E−05 | 5.0E−05 |
|  | Application Amount of Curing Agent (B) | kg/m² | 8.3E−03 | 8.3E−03 | 8.9E−03 | 8.9E−03 | 8.9E−03 | 8.6E−03 | 2.1E−02 | 4.2E−02 |
|  | (B)/(A) | kg/m³ | 166 | 166 | 178 | 178 | 178 | 173 | 420 | 840 |

TABLE 2-continued

| Physical Property | Elastic Modulus on Uncuring | Pa | 5.0E+04 | 5.0E+04 | 5.0E+04 | 5.0E+04 | 5.0E+04 | 5.0E+04 | 5.0E+04 | 5.0E+04 |
|---|---|---|---|---|---|---|---|---|---|---|
| | Elastic Modulus After 48 Hours | Pa | 7.5E+08 | 6.6E+08 | 7.8E+08 | 7.7E+08 | 6.3E+08 | 2.8E+08 | 5.4E+08 | 5.2E+08 |
| | Thickness of Adhesive Layer After Curing (Cured Layer) | μm | 61 | 60 | 60 | 60 | 60 | 60 | 65 | 69 |

| | | | Example 9 | Example 10 | Example 11 | Example 12 | Example 13 | Comparative Example 1 | Comparative Example 2 |
|---|---|---|---|---|---|---|---|---|---|
| Adhesive Layer | Type | | A | B | B | C | B | A | A |
| | Thickness (before curing) | μm | 50 | 25 | 50 | 75 | 3580 | 50 | 50 |
| Curing Agent Component | Type of Curing Agent | | IBMI12 | 1,2DMZ | 1,2DMZ | IBMI12 | 1,2DMZ | 1,2DMZ | IBMI12 |
| | Application Amount of Curing Agent Component | g/m² | 1.5 | 9.5 | 4 | 10 | 720 | 10.4 | 52.2 |
| | Proportion of Curing Agent | % | 100 | 80 | 10 | 100 | 80 | 1 | 100 |
| | Application Amount of Curing Agent | g/m² | 1.5 | 7.6 | 0.4 | 10.0 | 576.0 | 0.1 | 52.2 |
| Expression (1) | Thickness of Adhesive Layer (A) | m | 5.0E−05 | 2.5E−05 | 5.0E−05 | 7.5E−05 | 3.6E−03 | 5.0E−05 | 5.0E−05 |
| | Application Amount of Curing Agent (B) | kg/m² | 1.5E−03 | 7.6E−03 | 4.0E−04 | 1.0E−02 | 5.8E−01 | 1.0E−04 | 5.2E−02 |
| | (B)/(A) | kg/m³ | 30 | 304 | 8 | 133 | 161 | 2 | 1044 |
| Physical Property | Elastic Modulus on Uncuring | Pa | 5.0E+04 | 1.2E+05 | 1.2E+05 | 5.0E+04 | 2.3E+04 | 5.0E+04 | 5.0E+04 |
| | Elastic Modulus After 48 Hours | Pa | 4.8E+08 | 7.7E+08 | 5.2E+08 | 6.5E+08 | 2.4E+05 | With | With |
| | Thickness of Adhesive Layer After Curing (Cured Layer) | μm | 51 | 30 | 51 | 87 | 3602 | 51 | 73 |

As shown in Table 2, it was found that, in the Examples, which satisfied the expression (1), the elastic modulus after curing increased and that unevenness of curing of the adhesive layer after curing was reduced. On the other hand, in the Comparative Examples, which did not satisfy the expression (1), unreacted curing agent component remained in the adhesive layer. Alternatively, because the adhesive layer did not cure sufficiently, tackiness was caused.

Although embodiments have been explained above referring to the drawings, it is needless to mention that the invention is not limited to the examples. It is obvious that one skilled in the art can reach modified examples or corrected examples within the scope described in the claims, and it is understood that the examples of course belong to the technical scope of the invention. The constituent features in the embodiments may be combined freely within the scope which does not deviate from the contents of the invention.

REFERENCE SIGNS LIST

1 Adhesive layer
2 First adherend
3 Curing agent layer
4 Second adherend
5 Cured layer
6 Bonded structure
7 Bonding kit
8 Second base material layer
11 First adhesive layer
12 Second adhesive layer
13 First base material layer

The invention claimed is:

1. A bonding method for providing an adhesive layer and a curing agent layer between a first adherend and a second adherend to bond the first adherend and the second adherend, wherein the adhesive layer contains an epoxy resin as a main component and is cured by an effect of the curing agent layer, a curing agent contained in the curing agent layer is a polymerization catalyst type curing agent, and a thickness A (m) of the adhesive layer before curing and an application amount B (kg/m²) of the curing agent contained in the curing agent layer satisfy the expression (1) below:

$$5 < B/A < 900 \tag{1}$$

2. The bonding method according to claim 1, wherein the polymerization catalyst type curing agent is an imidazole compound.

3. The bonding method according to claim 1, wherein the elastic modulus (Pa) of the adhesive layer after curing is 10 times or more the elastic modulus (Pa) of the adhesive layer before curing.

4. The bonding method according to claim 1, wherein the elastic modulus (Pa) of the adhesive layer after curing is $5 \times 10^7$ (Pa) or more under the condition after lapse of 48 hours at room temperature (25° C.).

5. The bonding method according to claim 1, wherein a proportion of a solid resin in the adhesive layer before curing is 15 mass % or more and 80 mass % or less.

6. The bonding method according to claim 1, wherein the thickness of the adhesive layer before curing is 3 μm or more and 100 μm or less.

7. The bonding method according to claim 1, wherein the adhesive layer includes a porous sheet impregnated with an adhesive composition containing an epoxy resin as a main component.

8. The bonding method according to claim 1, wherein the adhesive layer contains, as the epoxy resin, a bisphenol epoxy resin and a multifunctional epoxy resin having three or more functional groups.

* * * * *